United States Patent [19]

The et al.

[11] Patent Number: 4,581,208

[45] Date of Patent: Apr. 8, 1986

[54] LOWERING ORGANIC CONTAMINANT CONTENT IN A SODIUM ALUMINATE SOLUTION BY OXIDATION IN A PACKED BED

[75] Inventors: Paul J. The, Murrysville; Fred S. Williams, Fox Chapel Borough; Thinnalur J. Sivakumar, Plum Borough, all of Pa.

[73] Assignee: Aluminum Company of America, Pittsburgh, Pa.

[21] Appl. No.: 748,918

[22] Filed: Jun. 26, 1985

[51] Int. Cl.$^4$ .............................................. C01F 7/02
[52] U.S. Cl. .................................. 423/130; 423/121; 423/600
[58] Field of Search ..................... 423/121, 122, 130

[56] References Cited

U.S. PATENT DOCUMENTS 4,038,039  7/1977  Carruthers et al. ................. 423/130
4,215,094  7/1980  Inao et al. ............................ 423/123

FOREIGN PATENT DOCUMENTS 2037722  7/1980  United Kingdom ................ 423/130

Primary Examiner—Herbert T. Carter
Attorney, Agent, or Firm—Glenn E. Klepac

[57] ABSTRACT

Wet oxidation of organic contaminants in aqueous sodium aluminate solutions is enhanced when a heated and oxygenated solution is passed through a packed bed containing a metal packing member that is chemically inert to sodium aluminate solutions at elevated temperatures. Process temperature is about 180°–300° C. and oxygen partial pressure is at least about 345 kPa. The packed bed has a packing surface of at least 100 square meters per cubic meter bed volume and preferably at least 50% free space.

14 Claims, 1 Drawing Figure

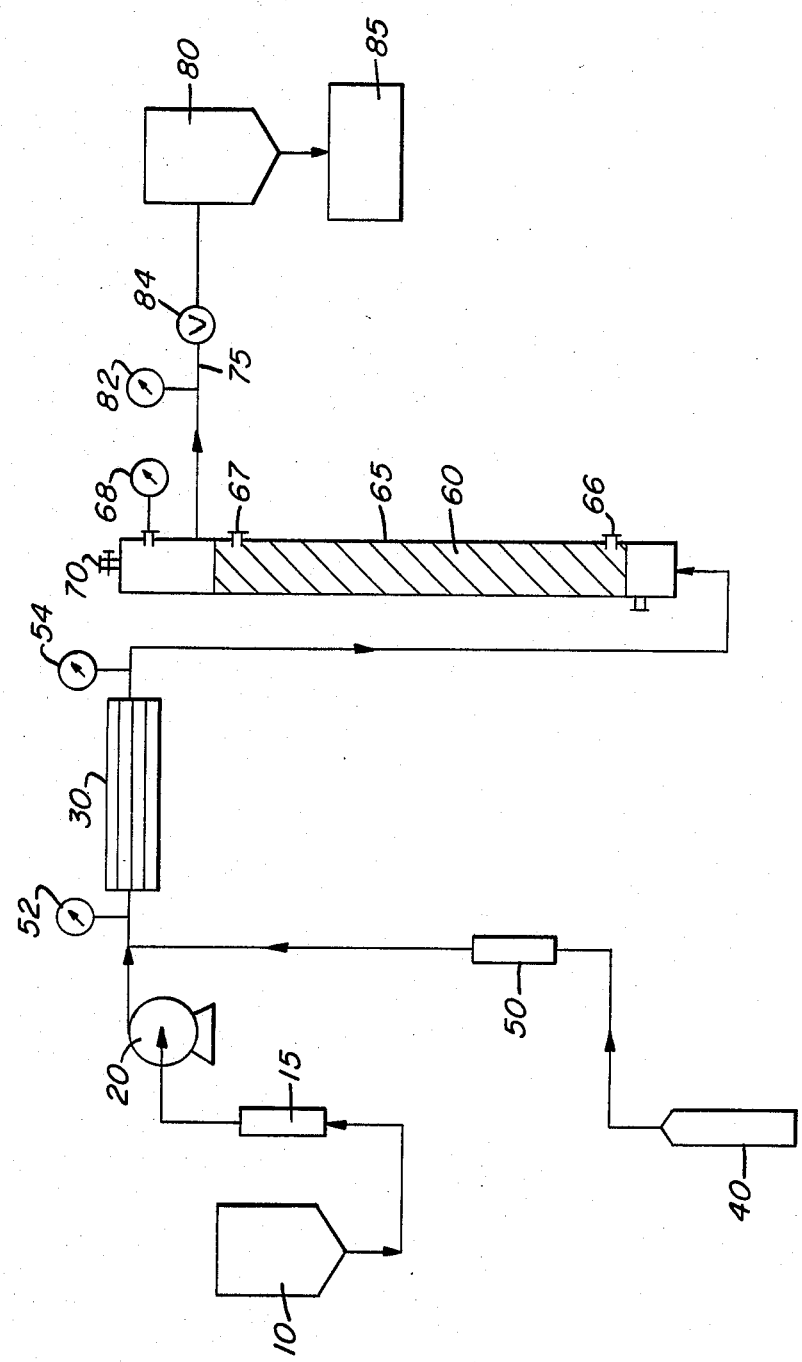

LOWERING ORGANIC CONTAMINANT CONTENT IN A SODIUM ALUMINATE SOLUTION BY OXIDATION IN A PACKED BED

BACKGROUND OF THE INVENTION

It is known that the presence of a significant amount of organic material in Bayer process liquor causes numerous problems. These problems include lower productivity of alumina; generation of an excessive proportion of fine alumina particles; higher impurities contents in the liquor and alumina; lower red mud settling rate; loss of caustic due to the formation of sodium organic compounds; increased liquor density, viscosity and boiling point and foaming of the liquor.

Numerous methods have been developed in the prior art for controlling organic compounds in Bayer process liquor. However, each of these prior art methods suffers from one or more serious limitations making it less than entirely suitable for its intended purpose.

For example, Inao et al U.S. Pat. No. 4,215,094 discloses a method for removing organic substances from an alkali aluminate solution wherein the solution is oxidized in the presence of a catalyst comprising copper ions. However, recovery of the copper ions from the solution requires addition of a chemical substance which reacts with the copper ions to form a water-insoluble precipitate. This chemical substance is generally a sulfide, which is itself an undesirable contaminant.

Some other methods for controlling organic compounds in Bayer liquor disclosed in the prior art are bauxite roasting (Hall U.S. Pat. No. 663,167); adsorption of liquor impurities onto activated alumina (Emerson U.S. Pat. No. 3,832,442); and addition of a soluble barium salt to the liquor (Mercier et al U.S. Pat. No. 4,101,629).

It is a principal objective of the present invention to provide a process for enhancing the wet oxidation of organic contaminants contained in a sodium aluminate solution.

An advantage of the invention is that the process does not require addition of copper ions, sulfides or other contaminants to the solution.

Additional objects and advantages of the present invention will become apparent to persons skilled in the art from the following specification and claims.

SUMMARY OF THE INVENTION

In accordance with the present invention, a sodium aluminate solution containing organic contaminants is heated to a temperature of about 180°–300° C. The sodium aluminate solution generally has a total alkali content of about 100–350 g/l (expressed as $Na_2CO_3$). The solution may comprise caustic soda and sodium carbonate in any proportion, although caustic soda generally predominates.

The solution is heated to a temperature of about 180°–300° C., preferably about 225°–300° C. and more preferably about 245°–300° C. Temperatures of about 250°–260° C. have been found particularly suitable. The solution may contain organic contaminants in any concentration. However, the process will generally be practiced on solutions containing organic contaminants in an initial concentration of at least about 10 grams organic C per liter.

The heated solution is contacted with a gas comprising molecular oxygen at a partial oxygen pressure of at least about 345 kPa. The gas may be oxygen, air, or other gas mixtures containing molecular oxygen. The partial oxygen pressure is at least about 650 kPa, more preferably at least about 1300 kPa. A partial oxygen pressure of about 1380 kPa is particularly preferred.

We have discovered that wet oxidation of organic contaminants is enhanced when the heated and oxygenated solution is then passed through a packed bed containing a packing member comprising a metal or alloy that is chemically inert to sodium aluminate solution at temperatures of at least 300° C. The packing member is preferably nickel or a nickel alloy comprising at least about 45 wt% nickel. Nickel-copper alloys are particularly preferred.

The packed bed has a packing surface $a_p$ of at least 100 square meters per cubic meter bed volume, preferably at least 200 square meters per cubic meter bed volume. The packed bed also preferably has a free space of at least about 50%. As used herein, the term "free space" refers to the percentage of bed volume that is not occupied by packing members.

The packing member may comprise a Raschig ring, Lessing ring, partition ring, Pall ring, or Berl saddle. Another suitable packing member is disclosed in U.S. Pat. No. 3,266,787 and is sold by Norton Company of Akron, Ohio under the trademark HY-PAK. Also suitable is a saddle-shaped packing member sold under the trademark Intalox. A preferred bed comprises a plurality of randomly arranged Raschig rings comprising hollow cylinders having a diameter of about 0.6–5 cm. The particularly preferred packed bed used in the Examples described herein is made up of 1.2 cm diameter MONEL Raschig rings and has a packing surface $a_p$ of approximately 400 square meters per cubic meter bed volume with about 85% free space.

The gas and the heated and oxygenated solution are preferably passed co-currently through the packed bed and the solution that is recovered has a lowered content of organic contaminants.

BRIEF DESCRIPTION OF THE DRAWINGS

The sole FIGURE is a schematic flow sheet diagram of the process of the invention.

DETAILED DESCRIPTION OF A PREFERRED EMBODIMENT

A preferred apparatus for practicing the process of the present invention is shown schematically in the drawing.

The apparatus includes a liquor tank 10 holding spent liquor from the Bayer process. The liquor comprises an aqueous sodium aluminate solution. The spent liquor used in the Examples below had an initial light transmission at 435 nm of 25% when dilutes 1:10 with distilled water. A distilled water reference standard had 100% transmission.

Liquor from the tank 10 is pumped past a magnetic flow meter 15 by a pump 20 to a nickel horizontal heat exchanger 30. The liquor is contacted with an oxygen-containing gas before it enters the heat exchanger 30. The gas contains significant concentrations of molecular oxygen and is preferably either oxygen or air. The gas is supplied by a pressurized cylinder 40. Gas flow rate is adjusted by a gas flow meter 50.

The heat exchanger 30 includes twelve horizontally oriented pipes, each having a length of 4.2 meters and 1.9 cm diameter. The solution is heated there by an oil heater to a temperature of about 180°–300° C. A first differential pressure gauge 52 monitors line pressure on the inlet side of the heat exchanger 30 and a second differential pressure gauge 54 measures line pressure on the outlet side.

The heated solution is passed through a packed bed 60 contained within a cylindrical nickel reactor 65. The reactor 65 has an inside diameter of 7.6 cm and is 11.3 meters high. It is packed with 1.2 cm diameter Raschig rings to a depth of 9.75 meters, giving a packed bed volume of about 0.044 cubic meters. To approach isothermal conditions, the upper and lower halves of the reactor 65 are provided with separate insulated strip heaters (not shown) which are maintained at the average temperatures of the liquor. Thermocouples 66, 67 are located near the bottom and top of the reactor interior for monitoring liquor temperature. A differential pressure gauge 68 is installed near the top of the reactor 65. The reactor 65 also includes a vent 70 for releasing gases formed by the process of the invention. These gases have been found to contain only about 0.2-0.3 mole% $H_2$, and they do not pose any explosion hazard.

The Raschig rings are preferably made from nickel or a nickel alloy comprising at least about 45 wt% nickel. One particularly preferred alloy is sold by International Nickel Company under the trademark Monel. The bed 60 described herein comprises 1.2 cm diameter Monel Raschig rings. Packing surface $a_p$ is approximately 400 square meters per cubic meter bed volume and free space is about 85%.

The treated solution is carried through an evacuation line 75 to a flash tank 80 where the solution is decompressed. A pressure gauge 82 and control valve 84 are installed in the line 75. Treated solution is recovered in a vessel 85 and analyzed.

Liquor flow rate is monitored by the magnetic flow meter 15 and also by measuring change of liquor level in the feed tank 10 over a period of time. Liquor flow rate is further checked periodically by the actual discharge rate from the flash tank 80, corrected for water vapor loss due to flashing.

Applicability of the process of the invention has been demonstrated by a series of tests, results of which are summarized in Tables I and II. The tests were conducted until a steady state was established, which generally took 2-3 hours. In each test, feed and oxidized liquor samples were collected and analyzed for $Al_2O_3$, total caustic (TC), total alkali (TA), organic carbon, oxalate and liquor color. Total caustic and total alkali concentrations are both expressed in terms of $Na_2CO_3$ equivalents. The gas mixture which accumulated at the top of the reactor 65 was also sampled and analyzed. Organic carbon concentrations in the liquor were determined using an organic carbon analyzer, Astro Model 1850. Oxalate concentrations were determined with an ion chromatograph. The liquor was measured by light transmission of 1:10 diluted samples at a wavelength of 435 nm with a reference standard of distilled water having 100% transmission.

TABLE I

Wet Oxidation with Oxygen

| Reactor Temp. (°C.) | System Pressure (kPa) | Liquor Flow Rate (L/min.) | Residence Time (min.) | Oxygen Rate (L/hr.) | Liquor Analysis g/L | | | | |
|---|---|---|---|---|---|---|---|---|---|
| | | | | | $Al_2O_3$ | TC | TA | Organic C | % T[a] |
| Starting Liquor | | | | | 55.4 | 186.6 | 258.6 | 15.5 | 25 |
| 1 | 217.9 | 2690 | 2.8 | 13 | 635 | 54.9 | 178.2 | 260.5 | 14.0 | 66 |
| 2 | 219.9 | 3170 | 2.8 | 13 | 1270 | 54.7 | 170.3 | 255.5 | 13.7 | 70 |
| 3 | 214.2 | 3445 | 2.8 | 13 | 2540 | 55.7 | 172.9 | 265.0 | 12.9 | 78 |
| 4 | 237.1 | 3445 | 2.8 | 13 | 635 | 53.7 | 170.8 | 256.6 | 13.2 | 81 |
| 5 | 230.5 | 3720 | 2.8 | 13 | 1270 | 55.6 | 168.6 | 259.5 | 13.4 | 84 |
| 6 | 236.1 | 3790 | 2.8 | 13 | 2540 | 56.3 | 163.2 | 254.7 | 13.0 | 84 |
| 7 | 252.4 | 4065 | 2.8 | 13 | 635 | 55.9 | 167.2 | 266.3 | 12.5 | 84 |
| 8 | 252.7 | 4135 | 2.8 | 13 | 1270 | 55.6 | 171.3 | 265.9 | 12.8 | 87 |
| 9 | 252.2 | 4135 | 2.8 | 13 | 2540 | 55.7 | 174.8 | 263.6 | 12.8 | 87 |

NOTES:
[a]Liquor color, measured by the light transmission of the 1:10 diluted liquor at 435 nm. Reference distilled water = 100%.

TABLE II

Wet Oxidation With Air

| Reactor Temp. (°C.) | System Pressure (kPa) | Liquor Flow Rate (L/min.) | Residence Time (min.) | Air Rate (L/min.) | Liquor Analysis g/L | | | | |
|---|---|---|---|---|---|---|---|---|---|
| | | | | | $Al_2O_3$ | TC | TA | Organic C | % T[a] |
| Starting Liquor | | | | | 48.9 | 182.3 | 245.9 | 17.6 | 16 |
| 1A | 227.5 | 4000 | 2.8 | 13 | 2540 | 49.2 | 176.9 | 253.0 | 17.1 | 64 |
| 2A | 256.5 | 4240 | 2.8 | 13 | 2540 | 48.8 | 175.3 | 250.7 | 16.7 | 67 |
| 3A | 258.5 | 4825 | 2.8 | 13 | 3810 | 48.3 | 175.5 | 252.0 | 16.0 | 72 |

NOTES:
[a]Liquor color, measured by the light transmission of the 1:10 diluted samples at 435 nm. Reference = 100% for distilled water.

While the present invention has been described in terms of certain preferred embodiments, it will be apparent to those skilled in the art that certain modifications and adaptations within the scope of the invention can be made to the process based upon the teachings presented herein and would be consistent with the invention as defined by the following claims.

What is claimed is:

1. A process for lowering the concentration of organic contaminants in a sodium aluminate solution, comprising
    (a) contacting a sodium aluminate solution containing organic contaminants with a gas comprising molecular oxygen at a partial oxygen pressure of at least about 345 kPa,
    (b) heating the oxygenated solution to a temperature of about 180°-300° C., (c) passing the heated and oxygenated solution through a packed bed containing a metal packing member comprising nickel or an alloy containing at least about 45 wt% nickel, said packing member being chemically inert to sodium aluminate solution at temperatures of at least 300° C., said packed bed having a packing surface $a_p$ of at least 100 square meters per cubic meter bed volume, and (d) recovering sodium aluminate solution having a lower content of organic contaminants.

2. The process of claim 1 wherein the packing member comprises a Raschig ring, Lessing ring, partition ring or Pall ring.

3. The process of claim 2 wherein said packing member comprises a plurality of randomly arranged packing members.

4. The process of claim 1 wherein said packing member comprises a plurality of Raschig rings.

5. The process of claim 4 wherein said Raschig rings comprise hollow cylinders having a diameter of about 0.6–5 cm.

6. The process of claim 1 wherein said packed bed has a free space of at least about 50%.

7. The process of claim 1 wherein said packing member comprises a nickel-copper alloy.

8. The process of claim 1 wherein said solution is passed through said bed co-currently with said gas.

9. The process of claim 1 wherein said solution is heated to a temperature of about 225°–300° C.

10. The process of claim 1 wherein said partial oxygen pressure is at least about 650 kPa.

11. The process of claim 1 wherein said partial oxygen pressure is at least aobut 1300 kPa.

12. The process of claim 1 wherein said solution has an initial organic carbon content of at least about 10 grams per liter.

13. The process of claim 1 wherein said solution has a total alkali content of about 100–350 g/l (expressed as $Na_2CO_3$).

14. A process for lowering the concentration of organic contaminants in a sodium aluminate solution, comprising (a) contacting an aqueous sodium aluminate solution containnig at least about 10 g/l organic contaminants with a gas comprising molecular oxygen at a partial pressure of at least about 1300 kPa, (b) heating the oxygenated solution to a temperature of about 245°–300+ C., (c) passing the solution and the gas co-currently through a packed bed containing a packing member comprising nickel or an alloy of nickel containing at least about 45 wt% nickel, said packing member being chemically inert to aqueous sodium aluminate solution at temperatures of at least 300° C., said packed bed having a packing surface $a_p$ of at least 200 square meters per cubic meter bed volume and a free space of at least about 50%, and (d) recovering aqueous sodium aluminate solution having a lower content of organic contaminants.

* * * * *